(12) United States Patent
Vangala et al.

(10) Patent No.: US 11,176,147 B2
(45) Date of Patent: Nov. 16, 2021

(54) QUERYING A RELATIONAL KNOWLEDGEBASE THAT PROVIDES DATA EXTRACTED FROM PLURAL SOURCES

(71) Applicant: Microsoft Technology Licensing, LLC, Redmond, WA (US)

(72) Inventors: Vipindeep Vangala, Hyderabad (IN); Shobana Balakrishnan, Redmond, WA (US); Pankaj Khanzode, Hyderabad (IN); Omar Zia Khan, Medina, WA (US); Nitin Agrawal, Redmond, WA (US); Ye-Yi Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 16/521,670

(22) Filed: Jul. 25, 2019

(65) Prior Publication Data
US 2021/0026859 A1    Jan. 28, 2021

(51) Int. Cl.
*G06F 16/2457* (2019.01)
*G06F 16/28* (2019.01)
(Continued)

(52) U.S. Cl.
CPC ...... *G06F 16/24578* (2019.01); *G06F 16/287* (2019.01); *G06F 16/9536* (2019.01); *G06N 5/022* (2013.01); *G06Q 10/063112* (2013.01)

(58) Field of Classification Search
CPC .............. G06F 16/9536; G06F 16/367; G06F 16/9024; G06F 16/9535; G06F 16/24578;
(Continued)

(56) References Cited

U.S. PATENT DOCUMENTS 4,817,032 A * 3/1989 Ohata ............... G06F 16/25
711/221
6,285,999 B1    9/2001 Page
(Continued)

FOREIGN PATENT DOCUMENTS

EP    2884409 A1    6/2015

OTHER PUBLICATIONS

PCT Search Report and Written Opinion for PCT/US2020/035799, dated Sep. 21, 2020, 16 pages.
(Continued)

*Primary Examiner* — Etienne P Leroux

(57) ABSTRACT

A computer-implemented technique is described herein for creating a relational data structure by extracting user data items from a collection of one or more applications sources. These data items evince interests exhibited by the users, and may include messages, documents, tasks, meetings, etc. The technique also collects knowledge data items from one or more knowledge sources. In one implementation, these data items may include terms used to describe skills possessed by the users. The technique constructs the data structure by providing objects associated with respective data items, and links between respective pairs of objects. In its real-time phase of operation, the technique allows a user to interrogate the relational data structure, e.g., to identify skills possessed by a particular user, to find users associated with a specified skill, etc.

18 Claims, 8 Drawing Sheets

(51) Int. Cl.
*G06F 16/9536* (2019.01)
*G06N 5/02* (2006.01)
*G06Q 10/06* (2012.01)

(58) Field of Classification Search
CPC ............... G06F 16/287; G06N 5/022; G06Q 10/063112
See application file for complete search history.

(56) References Cited

U.S. PATENT DOCUMENTS

| | | | |
|---|---|---|---|
| 8,150,844 | B2 | 4/2012 | Redstone et al. |
| 8,275,399 | B2 | 9/2012 | Karmarkar et al. |
| 8,756,276 | B2 | 6/2014 | Tseng et al. |
| 8,818,992 | B2 | 8/2014 | Punaganti et al. |
| 8,838,581 | B2 | 9/2014 | Tseng |
| 8,930,191 | B2 | 1/2015 | Gruber et al. |
| 9,357,031 | B2 * | 5/2016 | Keith, Jr. ............... H04L 63/10 |
| 2007/0027848 | A1 * | 2/2007 | Howard ............... H04M 1/2748 |
| 2011/0061004 | A1 * | 3/2011 | Tripathi ............... G06F 16/338 715/753 |
| 2012/0016678 | A1 | 1/2012 | Gruber et al. |
| 2012/0159326 | A1 | 6/2012 | Mital et al. |
| 2013/0097463 | A1 | 4/2013 | Marvasti et al. |
| 2013/0151495 | A1 * | 6/2013 | Bennett ............... G06F 16/951 707/706 |
| 2013/0204813 | A1 | 8/2013 | Master et al. |
| 2013/0275429 | A1 | 10/2013 | York et al. |
| 2014/0025660 | A1 | 1/2014 | Mohammed et al. |
| 2014/0047316 | A1 | 2/2014 | Strydom et al. |
| 2014/0201629 | A1 | 7/2014 | Heck |
| 2014/0280360 | A1 | 9/2014 | Webber et al. |
| 2014/0280936 | A1 | 9/2014 | Venkataramanan et al. |
| 2015/0019216 | A1 * | 1/2015 | Singh ............... G06F 16/24578 704/235 |
| 2015/0149390 | A1 | 5/2015 | Brdiczka et al. |
| 2015/0248459 | A1 * | 9/2015 | Miller ............... G06F 16/9024 707/741 |
| 2015/0293904 | A1 | 10/2015 | Roberts |
| 2015/0370787 | A1 | 12/2015 | Akbacak et al. |
| 2016/0170997 | A1 | 6/2016 | Chandrasekaran et al. |
| 2016/0267188 | A1 * | 9/2016 | Spaulding ............ G06F 16/9535 |
| 2016/0292299 | A1 | 10/2016 | Diwakar et al. |
| 2016/0314122 | A1 | 10/2016 | Platakis et al. |
| 2016/0314173 | A1 * | 10/2016 | Lydick ................ G06F 16/2457 |
| 2017/0091662 | A1 | 3/2017 | Sanchez et al. |
| 2018/0114111 | A1 | 4/2018 | Gill et al. |
| 2018/0150571 | A1 * | 5/2018 | Douglas ................. G06Q 10/06 |
| 2019/0155961 | A1 | 5/2019 | Alonso et al. |

OTHER PUBLICATIONS

Ounis, et al., "RELIEF: Combining expressiveness and rapidity into a single system," in SIGIR '98: Proceedings of the 21st Annual International ACM SIGIR Conference on Research and Development in Information Retrieval, Aug. 1998, pp. 266-274.

Hasan, et al., "Automatic Keyphrase Extraction: A Survey of the State of the Art," in Proceedings of the 52nd Annual Meeting of the Association for Computational Linguistics, Jun. 2014, pp. 1262-1273.

Merrouni, et al., "Automatic Keyphrase Extraction: An Overview of the State of the Art," in 4th IEEE International Colloquium on Information Science and Technology (CiSt), Oct. 2016, pp. 306-313.

Li, et al., "Personal Knowledge Graph Population from User Utterances in Conversational Understanding," in 2014 IEEE Spoken Language Technology Workshop (SLT), 2014, pp. 224-229.

International Search Report and Written Opinion issued in PCT Application No. PCT/US2017/056700, dated Jan. 26, 2018, 21 pages.

Purcher, Jack, "Apple introduces us to Siri, the Killer Patent," available at <<https://www.patentlyapple.com/patently-apple/2012/01/apple-introduces-us-to-siri-the-killer-patent.html>>, Patently Apple, Jan. 19, 2012, 20 pages.

Rosenblatt, Gideon, "Six Building Blocks for a Virtual Personal Assistant," available at <<https://www.the-vital-edge.com/virtual-personal-assistant/>>. The Vital Edge, Oct. 4, 2015, 8 pages.

"AIBrain: Augment Your Intelligence with AI," available at <<https://aibrain.com/solutions/>>, AIBrain, Inc., Menlo Park, CA, accessed on Jul. 10, 2018, 3 pages.

* cited by examiner

Search on your user graph — ☐ ×

Enter search terms (keyphrases). Hit space to see search suggestions for your specified phrase(s).

Pivot Term: [John Brown] [Contact ▼] } 708

Ranking Method: [PAGE_RANK ▼] } 710

Results Filter: [Skill ▼] } 712

Exclude Documents: [ ] } 714

[Search]

} 704

Your search results appear below:

| Rank | Name |
|------|------|
| 1 | ☐ Data Mining |
| 2 | ☒ MapReduce |
| 3 | ☐ Information Retrieval |
| 4 | ☐ MICROSOFT AZURE |
| 5 | ☐ Databases |
| 6 | ☐ Data Science |
| 7 | ☒ Artificial Intelligence |
| 8 | ☐ Natural Language Processing |
| 9 | ☐ Data Analysis |
| 10 | ☐ Predictive Analysis | see more . . .

716

Graph:

(key information)

718

} 706

Click on skills (above) and press "Post" to endorse John Brown's skills on LinkedIn:

[Post]

ILLUSTRATIVE PROCESS FOR CREATING A RELATIONAL DATA STRUCTURE 902

RECEIVE A FIRST COLLECTION OF DATA ITEMS FROM ONE OR MORE APPLICATION DATA STORES ASSOCIATED WITH ONE OR MORE APPLICATION SOURCES, THE FIRST COLLECTION OF DATA ITEMS PERTAINING TO ONE OR MORE USERS, AT LEAST SOME OF THE FIRST COLLECTION OF DATA ITEMS EVINCING INTEREST BY THE USER(S) WITH PLURAL SUBJECTS.
904

EXTRACT KEYPHRASES FROM THE FIRST COLLECTION OF DATA ITEMS.
906

RECEIVE A SECOND COLLECTION OF DATA ITEMS FROM ONE OR MORE KNOWLEDGE DATA STORES ASSOCIATED WITH ONE OR MORE KNOWLEDGE SOURCES THAT EXPRESS KNOWLEDGE ABOUT AT LEAST SOME OF THE KEYPHRASES.
908

IDENTIFY RELATIONS BETWEEN THE SECOND COLLECTION OF DATA ITEMS AND RESPECTIVE KEYPHRASES.
910

GENERATE A RELATIONAL DATA STRUCTURE THAT INCLUDES: FIRST OBJECTS RESPECTIVELY ASSOCIATED WITH DATA ITEMS IN THE FIRST COLLECTION OF DATA ITEMS, THE FIRST OBJECTS INCLUDING KEYPHRASE OBJECTS ASSOCIATED WITH THE KEYPHRASES; SECOND OBJECTS RESPECTIVELY ASSOCIATED WITH DATA ITEMS IN THE SECOND COLLECTION OF DATA ITEMS; AND LINKS THAT REFLECT RELATIONS AMONG THE FIRST OBJECTS, AND RELATIONS BETWEEN THE KEYPHRASE OBJECTS AND THE SECOND OBJECTS.
912

STORE THE RELATIONAL DATA STRUCTURE IN A DATA STORE.
914

FIG. 9

ILLUSTRATIVE PROCESS FOR APPLYING THE RELATIONAL DATA STRUCTURE 1002

RECEIVE A QUERY IN RESPONSE TO INTERACTION BY A USER WITH AN INPUT DEVICE.
1004

OPTIONALLY IDENTIFYING AN INITIAL SET OF OBJECTS IN A RELATIONAL DATA STRUCTURE THAT MATCH THE QUERY.
1006

OPTIONALLY EXPAND THE INITIAL SET OF OBJECTS BY IDENTIFYING ADDITIONAL OBJECTS THAT ARE LINKED TO THE INITIAL SET OF OBJECTS, AS BOUNDED BY A SPECIFIED DEGREE OF RELATIONSHIP TO THE INITIAL SET OF OBJECTS, THE INITIAL SET OF OBJECTS AND THE ADDITIONAL OBJECTS CORRESPONDING TO A PORTION OF THE RELATIONAL DATA STRUCTURE.
1008

PERFORM A RANKING OPERATION ON THE PORTION (OR THE ORIGINAL RELATIONAL DATA STRUCTURE) TO PROVIDE AN OUTPUT RESULT, THE OUTPUT RESULT IDENTIFYING ONE OR MORE OBJECTS IN THE PORTION (OR ORIGINAL RELATIONAL DATA STRUCTURE) THAT MATCH THE QUERY, ORDERED BY RELEVANCE TO THE QUERY.
1010

OPTIONALLY FILTER THE OUTPUT RESULT BASED ON A SPECIFIED FILTER CONDITION.
1012

PROVIDE THE FILTERED OUTPUT RESULT TO AN OUTPUT DEVICE.
1014

OPTIONALLY POST SKILL(S) AND/OR OTHER USER ATTRIBUTE INFORMATION BASED ON THE OUTPUT RESULT.
1016

FIG. 10

QUERYING A RELATIONAL KNOWLEDGEBASE THAT PROVIDES DATA EXTRACTED FROM PLURAL SOURCES

BACKGROUND

A user sometimes encounters a need to identify a characteristic associated with an individual, such as the domains of knowledge with which the individual is familiar. The user may address this task in piecemeal fashion by successively interrogating separate repositories of information. For example, the user may first perform a search using a file-sharing service to examine documents authored by the individual. The user may then access an online profile page associated with the individual, and so on. This fractured approach, however, may not yield fully satisfactory results. For instance, the separate services with which the user interacts provide isolated silos of information that may use separate terminology. The user may have difficulty assessing the accuracy and relevance of the information provided by any single service. The user may also experience the process of interacting with plural services as cumbersome and time-consuming.

SUMMARY

A computer-implemented technique is described herein for creating and interrogating a relational data structure, such as, but not limited to, a graph data structure. In a creation phase, the technique generates the relational data structure by extracting data items from one or more application stores associated with one or more applications sources. These data items evince interests exhibited by the users and are referred to herein as user data items. For example, the user data items can include messages, meetings, tasks, documents, etc. created by the users using respective applications. The technique also extracts knowledge data items from one or more knowledge data stores associated with one or more knowledge sources. For example, the knowledge data items may include skill-based terms used by one or more external network-accessible services (such as, without limitation, the LinkedIn® service). The technique generates the relational data structure by creating objects associated with the user data items and the knowledge data items. It further creates links that connect the objects together. Each link reflects a relationship between two linked objects.

According to one aspect, the technique also extracts keyphrases from the user data items. The technique then maps at least some of the keyphrases to associated knowledge data items. The relational data structure can express this relationship, for example, by linking keyphrase objects to associated skill objects.

According to another illustrative aspect, the technique can map keyphrases to knowledge items based on supplemental knowledge obtained from one or more knowledge sources. For example, the technique can determine that a keyphrase "Bayesian inference" maps to a skill "machine learning" based on supplemental knowledge that reveals that "Bayesian inference" is a term that is related to "machine learning." The technique can obtain the supplemental knowledge from existing repositories of information. Alternatively, or in addition, the technique can obtain the supplemental knowledge by manually supplying it or by using machine-trained models, etc.

In an application phase, the technique allows a user to interrogate the relational data structure by submitting a query to an interaction component. In one implementation, the interaction component responds to the query by finding an initial set of objects in the relational data structure that match the query. The interaction component can then optionally expand the initial set of objects to find additional objects that are linked to the initial set of objects within a specified degree of relationship (e.g., within three "hops"). The initial set of objects and the additional objects constitute a portion of the original relational data structure. The interaction component can then use a ranking algorithm to rank the relevance of objects in the portion to the query, to produce an output result. The interaction component can then optionally filter the output result to limit it to a specified object type or types.

According to one example, the query specifies a particular user, and the output result identifies a ranked set of skills that the particular user is presumed to possess. According to another example, the query specifies a particular skill, and the output result identifies a ranked set of individuals who are presumed to possess that particular skill. Many more ways of interrogating the relational data structure are possible. Each such output result ultimately reflects insight gleaned from the patterns of behavior exhibited by users, as expressed by the relational data structure.

Among its technical advantages, the technique provides a way that a user can gain insight about a subject based on information gleaned from plural sources, without the need for separately interrogating those separate sources. This allows a user to retrieve information in an efficient manner. Moreover, the technique synergistically reveals insights regarding the significance of facts and the relations among facts that cannot be gleaned from any data source by itself; hence, the technique does more than aggregate information provided by different sources. Further, the technique inherently discounts inaccurate data and noisy data of low relevance.

Moreover, the technique maintains the relational data structure as a layer of information that derives from the original data items in the application data stores and knowledge data stores, but otherwise does not affect those original data items. This allows the technique to derive insight from the application sources without interfering with their native functions or imposing new requirements on them. For instance, the technique does not require that the application sources adopt new data structures.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 shows an illustrative user interface presentation that can be presented by one of the applications of FIG. 6.

FIG. 9 is a flowchart that provides an overview of one process for creating a relational data structure.

FIG. 10 is a flowchart that provides an overview of one process for interrogating the relational data structure.

Figure 1:
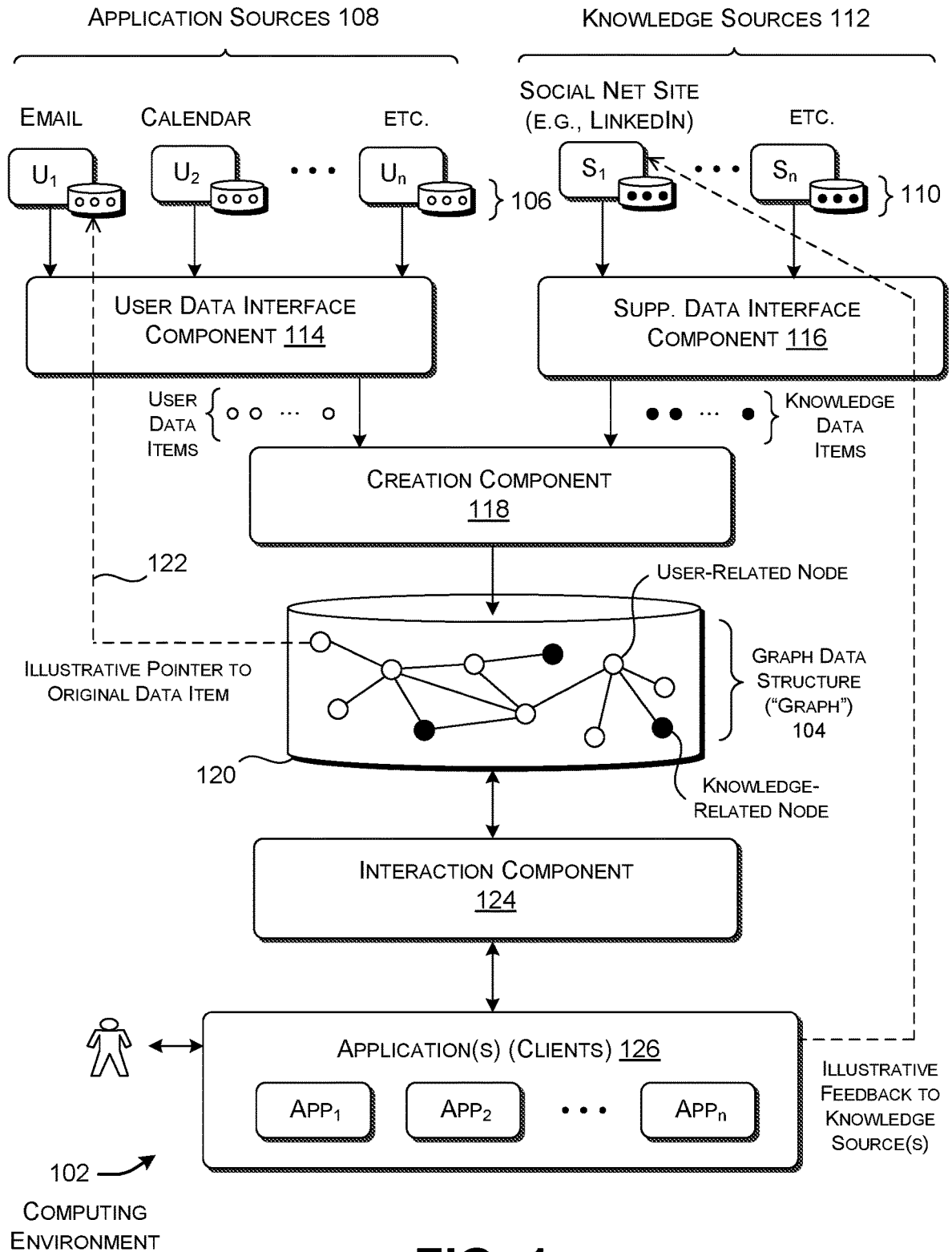
FIG. 1 shows an illustrative computing environment for building and applying a relational data structure, such as a graph data structure.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for creating and applying a relational data structure. Section B sets forth illustrative methods that explain the operation of the computing systems of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 for building and applying a relational data structure. In the principal examples set forth below, the relational data structure corresponds to a graphical data structure ("graph" for brevity). The graph includes nodes connected by edges. But the computing environment 102 can use any other type of relational data structure that includes objects that correspond to respective entities or "things," and links that describe the relationships among the objects. Hence, any use of the terms "graph" should be read as just one example of a "relational knowledgebase" (e.g., a "relational data structure"). The term "nodes" should be interpreted as just one example of "objects," and the term "edges" should be read as just one example of "links" or "relationships."

The computing environment 102 constructs the graph 104 based on a first collection of user data items received from one or more data stores 106 associated with one or more respective application sources 108, and a second collection of knowledge data items received from one or more knowledge data stores 110 associated with one or more respective knowledge sources 112. Each user data item pertains to one or more users. For example, a user data item may include data extracted from an Email message sent or received by a user. Another user data item may include data extracted from a meeting entry, associated with a meeting involving a user. Another user data item may include data extracted from a task entry, describing a task to be performed by a user. Another user data item may include data extracted from a document created by or otherwise associated with a user, and so on.

Each user data item may also evince interest expressed by one or more users in one or more subjects. For example, assume that an Email message sent between users discusses the design of a phased-array antenna. That Email message therefore evinces these two users' interest in the topic of phased-array antennas. Similarly, a task that prompts a user to submit a paper to a conference by a specified due date expresses the user's interest in the technical topic to which the conference is devoted. In many cases, a user's interest in a particular subject also evinces his or her skill with respect to that subject. For example, a user who frequently converses with colleagues via an Email platform regarding phased-array antennas can be expected to have knowledge and experience regarding the topic of phased-array antennas.

On the other hand, a knowledge data item corresponds to external information regarding some topic. For example, a knowledge data item may include a technical term extracted from an ontology of technical terms. The knowledge items in the ontology are said to be external (and not user data) because these terms appear in a general context, rather than in the context of a particular communication between users, or in the context of a particular document authored by a user, etc.

The application sources 108 include one or more applications for producing user data items. The application sources 108 correspond to program logic that executes on one or more computing devices (e.g., user computing devices, servers, etc.). Each application source stores data items in one or more application data stores using data structures native that that application source. For example, the application sources 108 can include an Email application for creating Email messages, a calendar application for setting up meetings, a task management application for setting up tasks, a document-processing application for creating and editing documents, and so on. Each such item generated by an application source constitutes a user data item.

The knowledge sources 112 can include any online sources of information. Each knowledge source stores data items in one or more knowledge data stores using data structures native that that knowledge source. For example, the knowledge sources 112 can include an online social networking service that provides profiles associated with respective users. One example of such is service is the LinkedIn® service provided by MICROSOFT CORPORATION of Redmond, Washington. The profiles may include a skill term selected from a list of available skill terms. Each skill term constitutes a knowledge data item. The knowledge sources 112 can also include an online encyclopedia, such as that provided by the Wikipedia website. Each entry provided by the online encyclopedia constitutes a knowledge item. Other knowledge sources include indexes associated with search engines, knowledgebases provided by virtual assistants, etc.

A first data interface component 114 collects user data items from the application sources 108, while a second interface component 116 collects knowledge data items from the knowledge sources 112. The data interface components (114, 116) can collect the data items using a pull-based approach, in which the data interface components (114, 116) poll the sources (108, 112) for data items. Alternatively, or in addition, the data interface components (114, 116) can collect the data items using a push-based approach, e.g., by relying on the sources (108, 112) to independently forward the data items to the data interface components (114, 116).

A creation component 118 produces the graph 104 based on the user data items and the knowledge data items, and stores the graph 104 in a data store 120. To perform this task, the creation component 118 creates a plurality of user-related nodes (more generally, objects) associated with the user data items, and a plurality of knowledge-related nodes (more generally, objects) associated with the knowledge data items. FIG. 1 illustrates the user-related data nodes as circles with white-colored centers, and the knowledge-related nodes as circles with black-colored centers. The creation component 118 also creates a plurality of edges (more generally, links) that connect together respective pairs of nodes, e.g., by linking together user-related nodes with other user-related nodes, linking together knowledge-related nodes with other knowledge-related nodes, and linking together user-related nodes with knowledge-related nodes.

Each node may contain some or all of the data associated with a respective data item. For example, in one implementation, the creation component 118 creates a user-related data node for a data item by extracting and storing metadata associated with a corresponding user data item. For instance, the creation component 118 can create a user-related data node for an Email message by extracting and storing at least a time that the Email message was sent, the sender of the Email message, the recipient(s) of the Email message, and optionally the contents of the Email message, etc. Each user-related data node can also include a pointer that points to a corresponding data item, as maintained in a separate data store. For example, FIG. 1 shows a pointer 122 that points from a user-related data node in the graph 104 to an original data item maintained in a data store associated with an application source.

In other words, the graph 104 represents an information layer that sits "atop" the original data items in the application data stores 106 and the knowledge data stores 110. This means that the relational graph 104 derives from the original data items, but does not otherwise interfere with the native functions performed by the application sources 108 and knowledge sources 112. Nor does the creation component 118 impose new requirements on these sources (108, 112). For instance, the creation component 118 does not require the application sources 108 and knowledge sources 112 to adopt new data structures to store their respective data items. All of these features contribute to the efficiency by which the components dedicated to creating and interrogating the graph 104 may be introduced into a preexisting computing environment, and the unobtrusiveness with which these components may thereafter operate in tandem with the native application functions performed by the computing environment.

The creation component 118 will be described in detail with reference to FIG. 4. Selected capabilities of the creation component 118 will be described below by way of introduction to this later explanation. First note that the creation component 118 can create a graph 104 having any scope. In a first case, the creation component 118 creates a graph that focuses on data items created by or otherwise associated with a particular user. This graph will contain references to other people, but only insofar as the user's behavior implicates these other people (e.g., because the user exchanged Email messages with those other people). In a second case, the creation component 118 can produce a graph that is scoped to a particular group of an organization, or a particular subset of people who have one or more characteristics in common. Here, the graph targets user data items created by or otherwise associated with the members of the group. In a third case, the creation component 118 can produce a graph that pertains to an entire organization, or plural organizations. Here, the graph encompasses the behavior of all members of the organization(s).

Among its components, the creation component 118 can include a keyphrase-extracting component (not shown in FIG. 1) that extracts keyphrases from user data items. For example, consider an Email message pertaining to the subject of machine learning. The keyphrase-extracting component may extract a first term "decision tree" as a first keyphrase, the term "backpropagation" as a second keyphrase, and so on. In other cases, the keyphrase-extracting component can extract keyphrases from meeting entries, task entries, documents, etc. The creation component 118 can then produce a keyphrase node associated with each extracted keyphrase. A keyphrase generally corresponds to one or more terms that appear in a data item that meet certain salience-related criteria defined by the keyphrase-extracting component.

The creation component 118 also includes a topic-identifying component (not shown in FIG. 1) that identifies topics associated with the user data items. For example, the topic-identifying component can identify the keyphrase "deep neural network" as describing a general category that encompasses other keyphrases, such as "convolutional neural networks," "recurrent neural networks," "generative adversarial networks," etc. The creation component 118 can produce a topic node associated with each identified topic.

The creation component 118 also includes a node-associating component (not shown in FIG. 1). The purpose of the node-associating component is to establish associations between user-related data nodes and corresponding knowledge-related data nodes. For example, assume that the keyphrase-extracting component extracts the phrase "ADAM" from an Email message. This term refers to a particular optimization technique for performing machine learning. But it is unlikely that a skill ontology provided by a knowledge source will include the specific term "ADAM." Rather, it may include the general term "machine learning optimization" or the like. This problem generally reflects the fact that experts often converse using terminology that is not necessarily mirrored in the formal ontologies provided by knowledge sources. The function of the node-associating component in this specific case is to link the term "ADAM" that appears in the Email message with the term "machine learning optimization" that appears in the ontology of a knowledge source.

To perform the above task, the node-associating component expands each term associated with a knowledge-related node under consideration into a plurality of related terms based on one or more supplemental knowledge sources. The creation component 118 can establish a link between a particular keyphrase and a knowledge-related node in those cases in which the particular keyphrase is included in a set of related terms associated with that knowledge-related node. For example, the creation component 118 can consult one or more supplemental knowledge sources to determine that the general term "machine learning optimization" is associated with the term "ADAM," among other terms describing other respective optimization techniques. The creation component 118 can then establish a link between the user-related data node associated with "ADAM" and the knowledge-related node associated with "machine learning optimization."

An interaction component 124 provides a service that allows different applications to interrogate the graph 104. In one implementation, the interaction component 124 can first identify an initial set of nodes in the graph 104 that match a query specified by a user. It can then expand those initial nodes to identify additional nodes; it can do this by following links that emanate from the initial nodes, with respect to any specified degree of relationship, e.g., by identifying all nodes that are linked to each initial node by three steps or "hops." This operation yields a subgraph that includes the initial set of nodes and any additional nodes that are identified by the expansion operation. The interaction component 124 can then perform a graph-ranking operation on the subgraph to rank the relevance of the nodes in the subgraph with respect to the query. Finally, the interaction component 124 can optionally filter the ranked nodes based on one or more specified factors, e.g., generating an output result that contains only nodes of a specified type (such as keyphrase nodes, skill nodes, etc.). Additional information regarding the operation of the interaction component 124 will be set forth below in connection with the explanation of FIG. 5.

A suite of graph-consuming applications 126 allows a user to interact with graph 104 via the interaction component 124. For example, a first application can correspond to a search component that allows a user to interrogate the graph 104 via the services of the interaction component 124. For example, a user can submit an input query that specifies a particular user. The first application can provide a ranked list of skills that the user is presumed to possess. This information ultimately reflects a pattern of behavior by the particular user in regard to these skills. For instance, the information may reflect the fact that the user has frequently conversed with others regarding subjects that evince his or her aptitude, knowledge, experience, etc., in particular subjects. In another example, a user can submit an input query that specifies a particular skill. The first application can then provide a ranked list of people who are presumed to possess that skill. Again, this information ultimately reflects the patterns of behavior exhibited by the identified users with respect to the identified skill. A search application can extract yet other information from the graph 104, as will be described in greater detail below in connection with the explanation of FIGS. 6, 7 and 8.

A second application allows the user to supplement a knowledge source based on the output results of the first application. For example, assume that the first application indicates that a user possesses a particular skill, such as anesthesiology. The second application can then automatically add this attribute to a profile page associated with this user, as maintained by a social networking site.

Overall, the computing environment 102 shown in FIG. 1 expedites the process of discovering attributes regarding individuals. This is because the computing environment 102 eliminates or reduces the need for the user to perform searches using plural applications and tools. Further note that the computing environment 102 provides a framework for synergistically revealing insights regarding the significance of facts and the relations among facts that cannot be gleaned from any source by itself. In this sense, the computing environment 102 does more than provide a compendium of information extracted from plural sources. Further, the interrogation component 124 can operate on the graph 104 to surface the most important and accurate information, while discounting unimportant and inaccurate information.

For example, assume that a user Email misstates a fact, e.g., by incorrectly attributing a skill to a particular person. The interrogation component 124 will not surface this inaccurate fact because the totality of linked information in the graph 104 does not agree with it, and therefore does not strengthen the relevance of this inaccurate fact.

Figure 2:
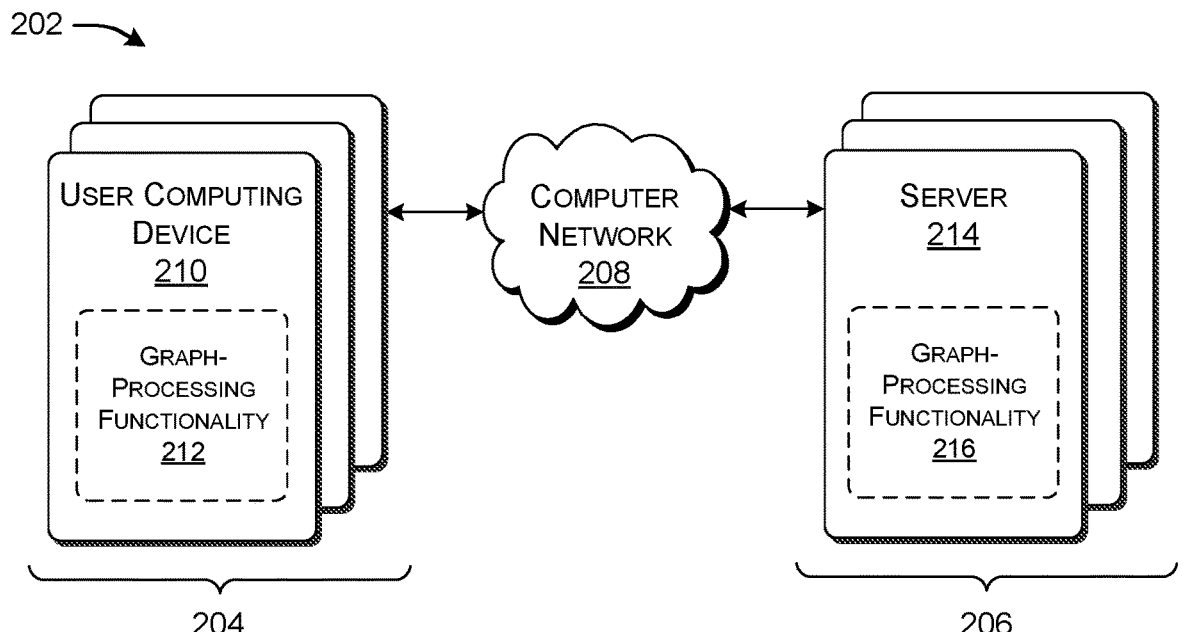
FIG. 2 shows computing equipment that can be used to implement the computing environment of FIG. 1.

FIG. 2 shows computing equipment 202 that can be used to implement the computing environment 102 of FIG. 1. The equipment 202 includes one or more user computing devices 204 coupled to one or more servers 206 via a computer network 208. The user computing devices 204 can include any combination of desktop personal computing devices, laptop computing devices, handheld computing devices of any type(s) (e.g., smartphones, tablet-type computing devices, etc.), wearable computing devices, Internet-of-Thing (IoT) devices, mixed-related devices, game consoles, etc. The computer network 208 can correspond to a wide area network, a local area network, one or more point-to-point links, or any combination thereof.

The functionality associated with the computing environment 102 can be distributed among the computing equipment 202 of FIG. 2 in any manner. For example, in one implementation, the servers 206 implement all functions of the computing environment 102. The user may interact with those functions via a browser program provided by a user computing device. In another implementation, the user computing devices 204 can implement at least some aspects of the application sources 108 and graph-consuming applications 126 in local fashion; the servers 206 can implement all other functions of the computing environment 102. In another implementation, the user computing devices 204 implement at least some aspects of the application sources 108, graph-consuming applications 126 and the interaction component 124 in local fashion; the servers 206 can implement all other functions of the computing environment. FIG. 2 generalizes the above flexibility in the allocation of functionality by indicating that a representative user computing device 210 can include any graph-processing functionality 212, and a representative server 214 can include any graph-processing functionality 216.

Figure 3:
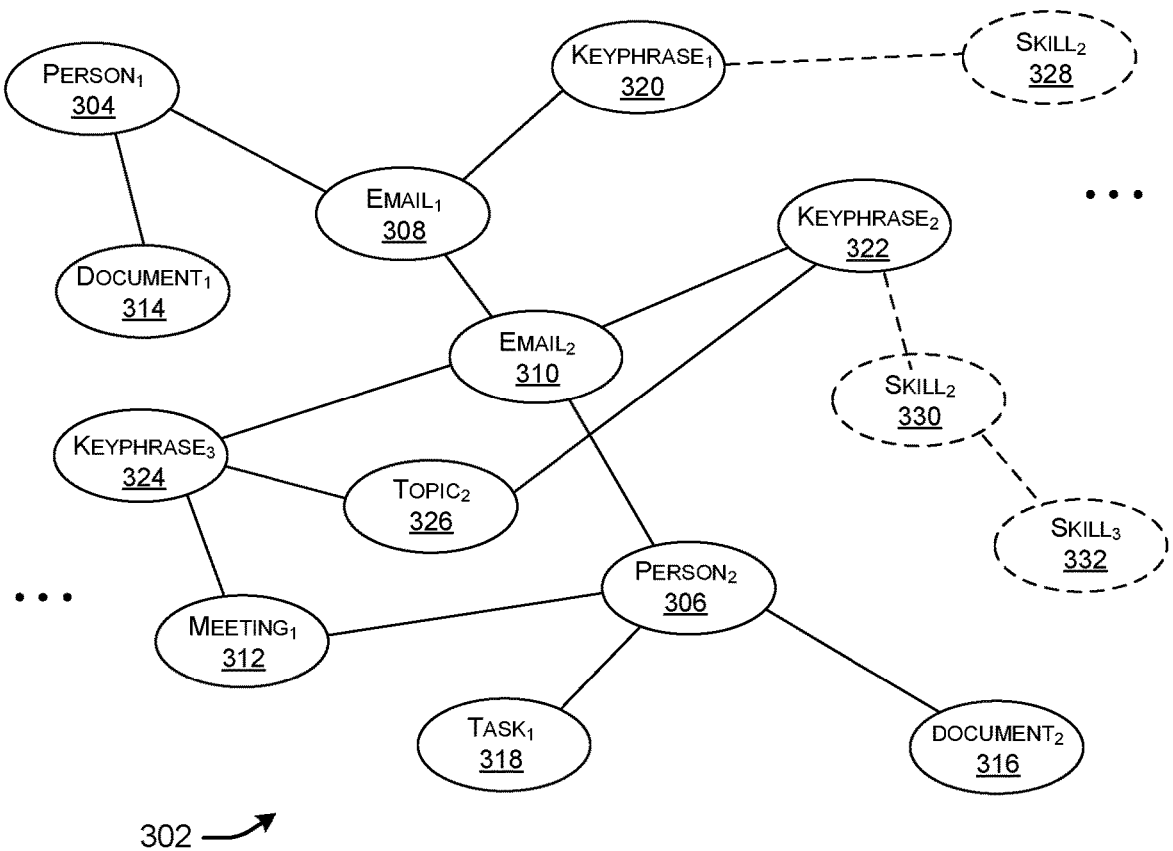
FIG. 3 shows a representative sample of a graph data structure created using the computing environment of FIG. 1.

FIG. 3 shows a small representative sample 302 of the graph data structure 104 ("graph") created using the computing environment 102 of FIG. 1. FIG. 3 represents the nodes in the graph 104 using ovals. Each oval includes a legend that identifies its type. FIG. 3 represents the edges in the graph 104 as links that connect pairs of nodes. In one implementation, each node corresponds to a distinct data construct that includes metadata that describes the node. Each user-related node also includes a pointer (not shown) that points to an original data item from which it was derived, as stored in a separate data store. By virtue of this feature, and as noted above, the creation component 118 can create the graph 104 without interfering with the application sources 108 that interact with the user data items as part of performing their native respective functions.

Assume that the sample 302 corresponds to a graph 104 that is scoped to a particular user. The sample 302 includes various user-related data nodes that express the user's interaction with one or more other people. Without limitation, these user-related nodes include: person nodes (304, 306, . . . ) that identify respective individuals; message nodes (308, 310, . . . ) that identify respective Email messages; meeting nodes (312, . . . ) that identify respective meetings that have been scheduled; document nodes (314, 316, . . . ) that identify respective documents; and task nodes (318, . . . ) that identify respective tasks that have been set up. The sample 302 also includes keyphrase nodes (320, 322, 324, . . . ) that identify respective keyphrases extracted from user data items (e.g., Email messages, meetings, documents, etc.). The sample 302 also includes topic nodes (326, . . . ) associated with respective topics. Finally, the sample 302 includes various skill nodes (328, 330, 332, . . . ) associated with respective skills. Each skill originates from a knowledge source.

The illustrated links shown in the sample 302 reflect various relationships among the nodes. For example, a link between the person node 304 and the message node 308 indicates that a particular person (associated with the person node 304) created or received an Email message (associated with the message node 308). A link between the message node 308 and the message node 310 indicates that two corresponding Email messages are related based on one or more factors of relatedness. For instance, the two Email messages may be related because they are part of a single thread, or sent within a prescribed span of time, etc. A link between the message node 308 and the keyphrase node 320 indicates that the keyphrase-extracting component has extracted a keyphrase (associated with the keyphrase node 320) from the Email message (associated with the message node 308). Similarly, a link between the meeting node 312 and the keyphrase node 324 indicates that the keyphrase-extracting component has extracted a keyphrase (associated with the keyphrase node 324) from a meeting (associated with the meeting node 312). The same keyphrase node 324 is also connected to the message node 310, indicating that the keyphrase-extracting component has extracted the same keyphrase from an Email message associated with the message node 310. The links that connect the topic node 326 to the keyphrase node 324 and the keyphrase node 322 indicate that a topic (associated with the topic node 326) encompasses both keyphrases associated with the keyphrase nodes (321, 324).

A link between the keyphrase node 320 and the skill node 328 indicates that a keyphrase (associated with the keyphrase node 320) is associated with a particular skill (associated with the skill node 328). A link between the skill node 330 and the skill node 332 indicates that two corresponding skills that are related; for instance, the skill node 330 can identify a skill of "supervised learning," while the skill node 332 can represent the more general skill of "machine learning."

An application can reason about the skills possessed by any user by following links through the sample 302. For example, assume that the person associated with the person node 304 is a university professor who has written or received an Email (associated with the message node 308) that pertains to the philosopher Epictetus. Further assume that the keyphrase-extracting component extracts the term "Epictetus" from the Email message as a keyphrase, and that the creation component 118 represents this keyphrase as the keyphrase node 320. That keyphrase, in turn, is related to the skill of "Stoicism," as represented by the skill node 328. This is one piece of evidence that the university professor knows something about the philosophy of Stoicism. This conclusion is strengthened to the extent that many user-related data nodes associated with this person directly or indirectly link to the skill node 328 associate with "Stoicism." A search may interrogate the graph 104 to identify that this person's skills include, in order, Hellenistic philosophy, Stoicism, Roman history, etc. Note that these insights do not originate from any one data source in isolation, but rather synergistically ensue from the connections between data items derived from multiple application sources 108 and knowledge sources 112. The interaction component 124 can identify strong relations by following the links in the graph 104 (in a manner described below).

Further note that the graph 104 automatically evolves as new items are created. The graph 104 can also seamlessly accommodate the introduction of new application sources and data types. For instance, assume that a new data item having a new data type appears that pertains to the subject of Stoicism. The graph creation component 118 will detect the word "Stoicism" and, as a result, integrate a node pertaining to this new data item into a preexisting web of information regarding the topic of Stoicism. In this sense, the computing environment 102 can be said to scale well to introduction of new data items.

Figure 4:
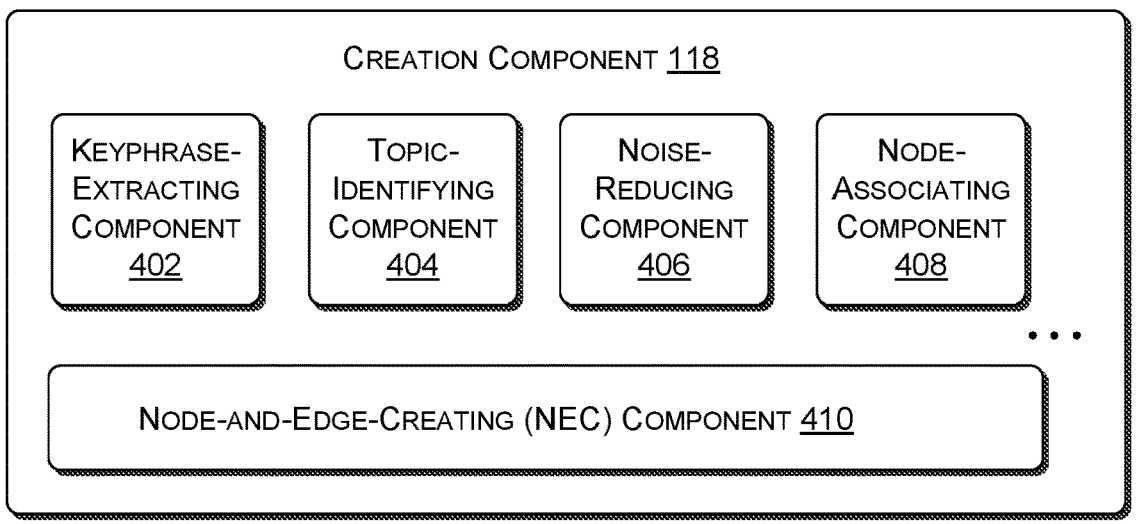
FIG. 4 shows one implementation of a creation component, which is an element of the computing environment of FIG. 1.

FIG. 4 shows one implementation of the creation component 118. As explained above, the creation component 118 performs the main task of creating the graph 104 based on user data items and knowledge data items that it receives from the data interface components (114, 116).

A keyphrase-extracting (KPE) component 402 extracts keyphrases from user data items that contain textual information, such as Email messages, calendar entries, documents, task entries, etc. In one case, the KPE component 402 can generate a set of features associated with each candidate keyphrase, and then use a machine-trained classification model and/or a rules-based engine to determine, based on the features, whether the candidate keyphrase corresponds to a valid keyphrase or not. The features can include statistical features, such as term-frequency-inverse-document frequency (tf-idf) information. The features can also include contextual features, such as an indication of the placement of the candidate keyphrase in the data item from which it is extracted. For example, this kind of feature can indicate whether the candidate keyphrase appears in the title of the data item or in some other prominent position in the data item. The features can also include syntactic features, such as an indication of the part-of-speech tag(s) associated with the candidate keyphrase. The features can also include evidence that is based on external resources, meaning resources that are external to the data item in which the candidate keyphrase appears. For example, this kind of feature can indicate how many times that the candidate key phrase appears in a query log provided by a search engine, and so on. Any machine-trained classification model can be used to classify the features, such as, without limitation, a naive Bayes model, a decision tree model, a support vector machine model, a maximum entropy model, and so on. A training system (not shown) generates the machine-trained model based on a corpus of phrases, each of which is given a label that indicates whether or not it corresponds to a valid keyphrase.

Other approaches use an unsupervised strategy to determine whether a candidate keyphrase is a valid keyphrase. For instance, the KPE component 402 can represent the words in a data item as nodes in a graph, with links connecting related words (in which relatedness is assessed based on syntactic and/or semantic similarity). A graph-based ranking algorithm (such as PageRank™) can then be used to determine the relevance of each node in the graph. The KPE component 402 can identify a candidate phrase as a valid keyphrase if its relevance score is above a prescribed threshold.

Background information regarding the standalone topic of keyphrase extraction can be found in Hasan, et al., "Automatic Keyphrase Extraction: A Survey of the State of the Art," in Proceedings of the $52^{nd}$ Annual Meeting of the Association for Computational Linguistics, June 2014, pp. 1262-1273, and Merrouni, et al., "Automatic Keyphrase Extraction: An Overview of the State of the Art," in $4^{th}$ IEEE International Colloquium on Information Science and Technology (CiSt), October 2016, pp. 306-313.

A topic-identifying component 404 identifies topics associated with keyphrases or other linguistic items. In one approach, the topic-identifying component can identify topics by clustering keyphrases extracted from a plurality of user data items. It can perform this clustering operation in various ways, such as by using a deep neural network to convert the keyphrases into respective semantic vectors in a low-dimensioned semantic space, and then clustering those vectors into groups using any clustering algorithm (such as the k-means clustering algorithm). The clustering algorithm can compute the distance between any two vectors using any distance metric, such as cosine similarity. The topic-identifying component 404 can then pick a representative keyphrase from each cluster to serve as a topic for the cluster. It can make this choice based on one or more factors. For example, the topic-identifying component 404 can compute a score for each keyphrase in a cluster based on its frequency-of-appearance (based on the number of times it appears within a corpus of user data items), based on the position in which it typically appears in the data items, and so on. The topic-identifying component 404 can then pick the keyphrase that has the best score within the cluster.

Alternatively, or in addition, the topic-identifying component 404 can mine topic information provided by one or more external knowledge bases. For example, the topic-identifying component 404 can adopt topics specified in a knowledgebase used by the BING search engine provided by MICROSOFT CORPORATION, or a virtual assistant. Or it can adopt topics specified in the category information used by an online encyclopedia (such as that provided by the Wikipedia website), etc. The topic-identifying component 404 can link a topic derived from an external knowledge source with a keyphrase extracted from a data item based on a finding that the topic co-occurs with the keyphrase with a prescribed co-occurrence frequency, within a corpus of user data items.

A noise-reducing component 406 can apply various rules and/or machine-trained models to remove keyphrases and topics that are considered of low value, and therefore noise. For example, the noise-reducing component 406 can remove a candidate keyphrase upon finding that its tf-idf score is below a prescribed threshold. The noise-reducing component 406 can also remove a keyphrase if it fails to appear in an external knowledgebase, etc.

Although not shown, the creation component 118 can include yet other analysis tools, including, but not limited to: an entity-extracting component, a natural language understanding (NLU) component, a time-extracting component (that identifies a time associated with each user data item), a location-identifying component (that identifies a location associated with each user data item, if any), a person disambiguation component (that resolves the identity of a person mentioned in a user data item), and so on.

A node-associating component 408 links user-related nodes to associated knowledge-related nodes. For example, consider the concrete case in which the user-related nodes include keyphrases extracted from Email messages, documents, tasks, meetings, etc., while the knowledge data items correspond to skill terms that describe respective skills. Further assume that the knowledge data items originate from a particular knowledge source, such as an online social networking site that adopts a particular ontology of skills to describe the expertise of its subscribers. In this context, the goal of the node-associating component 408 is to link keyphrase nodes to associated skill nodes. The challenge associated with this task ensues from the problem stated above in which the terminology used by users in day-to-day conversations does not match the ontology(ies) used by the knowledge sources.

The node-associating component 408 operates by expanding each term that describes a skill to a group of related terms. In one approach, the node-associating component 408 can perform this task by consulting an external knowledgebase that maps a specified skill term into plural related terms. The external knowledgebase may correspond to an online thesaurus, a knowledgebase associated with a search engine (such as the BING search engine provided by MICROSOFT CORPORATION), a knowledgebase provided by a virtual assistant (such as SATORI virtual assistant provided by MICROSOFT CORORATION), a manually-curated knowledge repository, and so on. In another approach, the node-associating component 408 can access a page of an online encyclopedia (such as Wikipedia) that is associated with the skill term under consideration. It can then apply keyphrase extraction on the page to generate the group of related terms associated with the skill term. After expanding the skill term, the node-associating component 408 determines whether a keyphrase under consideration is included in the set of related terms associated with the skill term. If so, the node-associating component 408 establishes a nexus between the keyphrase (and its associated keyphrase node) and the skill term (and its associated skill node). Note that it is possible that the above process will reveal that a single keyphrase is related to two or more skills.

In another implementation, the node-associating component 408 can determine whether a keyphrase is related to a skill term by expanding both the keyphrase and the skill term. The node-associating component 408 can consider these two phrases equivalent if the expanded groups have a prescribed number of common phrases. In another implementation, the node-associating component 408 can determine whether a keyphrase is related to a skill term by using any type of machine-trained model. For example, the node-associating component 408 can use a deep neural network to convert both phrases into vectors in a low-dimensional semantic space. The node-associating component 408 then considers the two phrases as related if the distance between the vectors is below a prescribed threshold value. The distance can be computed using any distance metric, such as cosine similarity.

The node-associating component 408 can also be used to find relations among knowledge-related nodes. For example, the node-associating component 408 can use any technique described above to determine the relations among skills specified by an online social networking site. Alternatively, or in addition, the social networking site may already specify relations among its skills, e.g., by organizing its skills in a hierarchy. In that case, the node-associating component 408 can adopt those specified relations.

A node-and-edge-creating (NEC) component 410 creates the actual nodes and edges of the graph 104. The NEC component 410 uses a first data construct to create each node. The data construct includes metadata that describes a corresponding data item. The data construct also includes information that identifies the type of data node being created. For example, for an Email message, the data construct identifies the corresponding node as a message-type node. For the case of a user-related data node, the data construct also includes a pointer that points to the original data item (in a separate data store) from which it is derived. The NEC component 410 uses a second data construct to create each edge. That data construct includes references to the two nodes that the edge connects. The second data construct also identifies a type of relationship associated with the edge being created. For example, for an edge that points from a document node to a person node, the second data construct can include an Authored_By label that identifies the edge as designating an author of the document.

Note that the nodes in the graph 104 can include metadata that also establishes implicit links between nodes, without allocating a separate data construct to describe each such relation. For example, each node can include location data and time data. The interaction component 124 can leverage this metadata to establish a nexus between nodes that share the same time information and/or location information. The location and time data associated with a node can therefore be considered an implicit link to other nodes.

Figure 5:
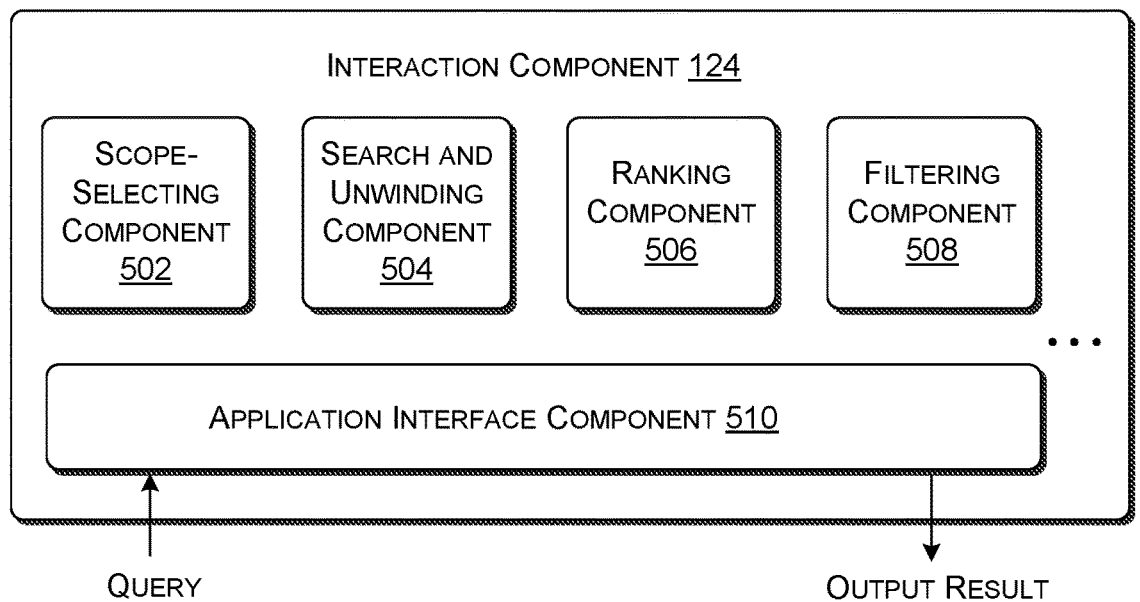
FIG. 5 shows one implementation of an interaction component, which is another element of the computing environment of FIG. 1.

FIG. 5 shows one implementation of an interaction component 124. As described above, the interaction component 124 provides a service to the graph-consuming applications 126 that enables the graph-consuming applications 126 to interrogate the graph 104. In other implementations, any individual application can incorporate the functionality of the interaction component 124 as a native resource. Or any individual application can incorporate parts of the functionality of the interaction component 124, but not the entirety of that functionality.

A scope-selecting component 502 receives a request by a user to create a graph having a specified scope. For example, the user may request a graph that focuses on behavior of a single individual, a group of individuals, or an organization as a whole. The scope-selecting component 502 forwards that request to the creation component 118. In response, the creation component 118 works in cooperation with the data interface components (114, 116) to collect the appropriate data items for the graph, and then to transform the data items into the graph 104. In other implementations, a master graph for an organization already exists. If the user requests a smaller portion of the master graph, then the creation component 118 extracts an appropriate subgraph from the master graph.

A search and unwinding component 504 ("search component" for brevity) performs initial processing on an input query supplied by a user using an input device. More specifically, the search component 504 begins by finding an initial set of one or more nodes that match an input query. For example, assume that the user inputs a query that includes the term "backpropagation." The search component 504 finds a set of initial nodes, each of which includes or is otherwise associated with this string. These nodes may include document nodes, meeting nodes, message nodes, etc. More specifically, in some cases, a user may craft a query that asks the search component 504 to find all nodes that match a specified string, regardless of the node types associated with the matching nodes. In other cases, the user may generate a query that asks the search component 504 to find all nodes that match the specified string and a specified node type. In any case, the query condition that is used to find the initial set of nodes is referred to herein as a pivot because it serves as a seed dimension from which the graph 104 is explored.

The search component 504 can then perform an optional unwinding operation to identify additional nodes that are related to the set of initial nodes. This unwinding operation yields a subgraph that is composed of the initial set of nodes and the additional nodes. The search component 504 performs the unwinding operation by following links that emanate from the initial nodes with respect to a prescribed number of "hops" or steps. For example, assume that an initial node corresponds to a message node, associated with an Email message that includes the query term "backpropagation." The search component 504 can follow a link from the message node to a person node, associated with a person who is named in the Email message. The search component 504 can then follow a link from the person node to another Email message that names this same person, and so on. Different implementations can use different rules to control the unwinding operation. For example, the search component 504 can include a rule that specifies how many steps it should take when performing the unwinding operation (e.g., three steps in one case). The search component 504 can apply another rule that determines what links to follow when performing each unwinding step (e.g., by identifying that some edge types are to be followed but not others).

A ranking component 506 performs a graph-based ranking operation on the subgraph identified by the search component 504. In performing that operation, the ranking component 506 assigns a score to each node in the subgraph based on its assessed relative importance in the subgraph. The ranking component 506 determines the importance of each node, in turn, based on the links that lead to it, both directly and indirectly.

In one non-limiting implementation, the ranking component 506 uses the PageRank™ algorithm to assign a ranking score $R(p_i)$ to each node $p_i$ under consideration:

$$R(p_i) = \frac{1-\alpha}{N} + \alpha \sum_{p_j \in S(p_i)} \frac{R(p_j)}{L(p_j)}.$$

The term $p_j$ refers to a node that links to the node $p_i$ under consideration, within a set $S(p_i)$ of such nodes that link to the node $p_i$. $R(p_j)$ is the ranking score associated with a node $p_j$, and $L(p_j)$ is the number of links that point outward from the node $p_j$. N is the number of nodes in the subgraph, and a is a constant damping factor. Overall, the ranking component 506 produces an output result that identifies a ranked set of nodes that match the query. Other implementations can use other random-walk ranking algorithms (that is, besides PageRank™).

A filtering component 508 can optionally filter the output result based on one or more specified node types, to produce a filtered output result. For example, the filtering component 508 can extract a subset of nodes in the output result that pertain to person nodes, to produce a filtered output result that omits any nodes that are not person nodes. Or the filtering component 508 can extract a subset of nodes in the output result that pertain to skill nodes, to produce a filtered output result, and so on.

Note that not all searches may invoke all of the components of the interaction component 124. For example, assume that the graph 104 is scoped to include nodes that focus on a particular user. The user can input a query that requests the interaction component 124 to perform the ranking operation on all of the nodes of the graph 104 (without specifying a search string), and then filter the ranked nodes so that they include only skill nodes. This search operation will return a ranked list of skills associated with the user. Note that this scenario does not involve use of the search component 504 because it operates on the entire graph 104.

An application interface component 510 provides an interface that allows the graph-consuming applications 126 to interact with the interaction component 124. In one implementation, for instance, the application interface component 510 can provide an application programming interface (API) by which the graph-consuming applications 126 may submit queries to the interaction component 124 and receive an output result from the interaction component 124.

Figure 6:
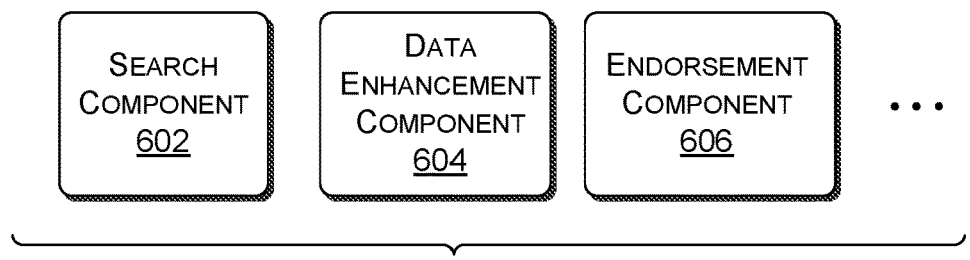
FIG. 6 shows one implementation of a set of applications that can interact with the relational data structure via the interaction component of FIG. 5.

FIG. 6 shows one implementation of various graph-consuming applications 126 that can interact with the graph data structure 104 via the interaction component 124. A search component 602 provides a user interface presentation for submitting queries to the interaction component 124, and for receiving associated output results provided by the interaction component 124. A data enhancement component 604 provides a tool for enhancing an external knowledge source (or any other resource) based on information extracted from the graph 104. For example, the data enhancement component 604 can modify an ontology provided by an external knowledge source to include new terms and/or relations; these terms and/or relations, in turn, are discovered in response to interrogating of the graph 104. An endorsement component 606 provides a tool for endorsing a user on a social networking site or any other forum, e.g., by affirming that the user possesses a particular skill; this insight, in turn, is gained in response to interrogating the graph 104. A recommendation component (not shown) provides a tool for recommending one or more topics or keywords given a user's specification of an initial topic or keyword.

In some cases, an application may represent a standalone program that provides a service to a user. In other cases, an application may be embedded in a larger programmatic context. For example, a search engine may include the search component 602 as part of its suite of services. In another context, an Email application can include the search component 602 as part of its functionality.

The above-described applications are described by way of illustration, not limitation. Other implementations can adopt yet other uses of the interaction component 124.

FIG. 7 shows an illustrative user interface (UI) presentation 702 that can presented by an application that combines the search component 602 and the endorsement component 606.

The search component 602 provides a first section 704 that allows the user to input a query to the interaction component 124. It includes a second section 706 that displays the output result provided by the interaction component 124. With respect to the first section 704, a first control 708 allows the user to input one or more search terms and/or one or more optional node types. In response, the interaction component 124 identifies an initial set of nodes that match both the search term(s) and the node type(s). Here, the first control 708 receives a name "John Brown" and the user's specification of a "contact" node type (e.g., a person node type). The interaction component 124 processes this query by finding a set of person node(s) in the graph 104 that match the specified name. A second control 710 allows the user to specify the graph-ranking method to be applied by the ranking component 506. Here, the user has selected the PageRank™ technique. A third control 712 allows a user to specify a filter to be used to filter the output result provided by the ranking component 506. Here, the user instructs the filter component 508 to provide a filtered output result that includes only skill nodes. A fourth control 714 allows the user to instruct the interaction component 124 to exclude document nodes when performing the search operation. Note that the user can omit any search attribute described above, e.g., by declining to specify a node type in the first control 708.

With respect to the second section 706, a first subsection 716 specifies a list of skills associated with the identified person (John Brown), ranked in order of relevance. These skills correspond to respective skill nodes identified by the interaction component 124. A second subsection 718 graphically depicts the ranked nodes in the subgraph. That is, the second subsection 718 represents each node in the subgraph as a circle, the size of which depends on its ranking score. The second subsection 718 can allow a user to click on any node in the subgraph, thereby specifying a new pivot. The interaction component 124 can update its output result given this new pivot.

The endorsement component 606 presents a third section 720. Through this section 720, the user can instruct a social networking site to post selected skills identified in the first subsection 716 for the identified person, John Brown. Without this functionality, the user would need to access the social network site, determine the ontology it uses to describe skills, access John Brown's profile page, and manually enter appropriate skills into that profile page.

Figure 8:
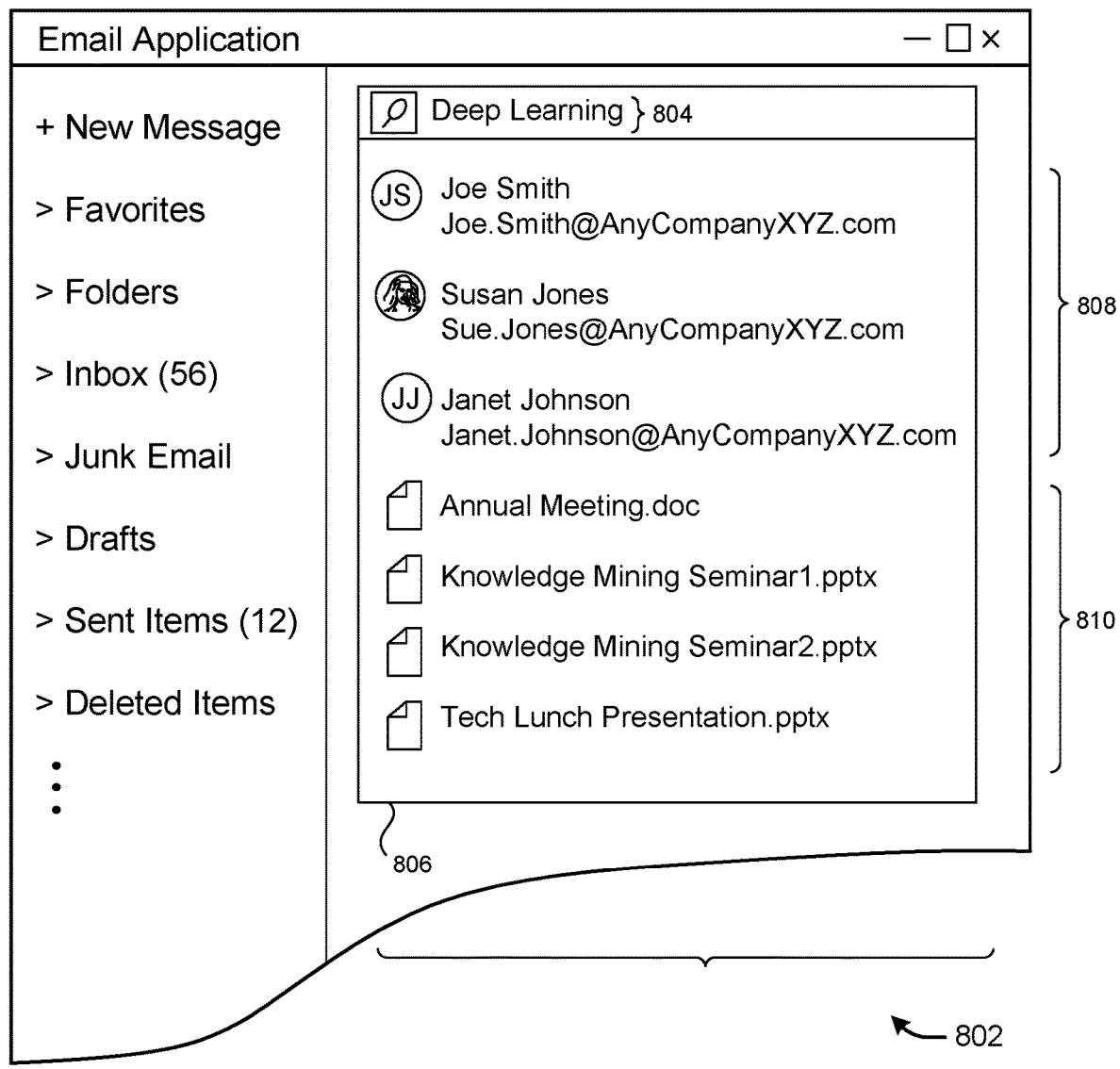
FIG. 8 shows another illustrative user interface presentation that can be presented by one of the applications of FIG. 6.

FIG. 8 shows an illustrative UI presentation 802 provided by an Email application in conjunction with the search component 602 of FIG. 6. The UI presentation 802 includes an input box 804 for receiving an input query, here the string "deep learning." The UI presentation 802 includes an output box 806 for providing the output result generated by the interaction component 124. More specifically, the output result includes a first set of data items 808 that identify people relevant to the query term, corresponding to respective person nodes in the graph 104. The output result includes a second set of data items 810 that identify documents relevant to the query term, corresponding to respective document nodes.

Most generally, any parent system can integrate any of the graph-consuming applications 126 into its functionality. Here in FIG. 8 it is an Email application that hosts the search component 602. In another example, a search engine can integrate the search component 602 into its functionality.

This Section will close with examples that demonstrate specific queries submitted by the search component 602 to the interaction component 124, and the output result returned by the interaction component 124 to the search component 602. These examples are to be understood in the spirit of illustration, not limitation.

In a first example, the user submits a query that identifies the name of a particular user, and specifies the filter type of "skills." In response, the interaction component 124 identifies the top skills possessed by the identified person. More specifically, in a first case, the user can also specify a node type of "contacts." The interaction component 124 will respond to pivoting on contact node(s) associated with the specified name. In a second case, the user need not specify the node type(s) associated with the pivot (e.g., by omitting a node type selection in the control 708 of FIG. 7). In this case, the interaction component 124 will identify an initial set of nodes without regard to the types of those nodes.

In a second example, the user submits a query that identifies the name of a particular skill, and specifies the filter type of "contact." In response, the interaction component 124 identifies a set of people who are most strongly associated with the identified skill.

In a third example, the user submits a query that identifies a particular node type (such as a keyphrase node type), without specifying a string. In response, the interaction component 124 will rank all nodes in the graph 104 of that type, without first matching them with any string.

In a fourth example, the user submits a query that specifies a string (such as the string "backpropagation") and the filter type of "documents." In response, the interaction component 124 will identify a set of documents that are most relevant to the identified string.

In a fifth example, the user submit a query that specifies a particular string and a filter type of "keyphrase." In response, the interaction component 124 will return the keyphrases that are most relevant to the input string. A recommendation component can leverage this type of query to provide suggestions to the user.

In a sixth example, assume that a user's query specifies two or more query terms joined by the AND operator, e.g., by specifying "quantum computing AND "Josephson junction." The interaction component 124 can perform a search based on the first query term ("quantum computing") in the same manner specified above, to identify a first set of ranked nodes. When performing a search based on the second query item ("Josephson junction"), the interaction component 124 can ignore a newly-identified node if it is not connected to at least one node in the first set of ranked nodes by a prescribed number of hops (e.g., two hops). Otherwise, the interaction component 124 adds the newly identified node to the output result. This provision ensures that the interaction component 124 does not create isolated clusters of nodes that have little bearing on each other. The interaction component 124 applies this manner of operation for the case in which the query includes additional search terms. For example, when performing a search based on a third query term (e.g., "qubit"), the interaction component 124 can ignore a newly-identified node if it is not connected to at least one previously-identified node (based on the search terms "quantum computing" and "Josephson junction"), with respect to a prescribed number of hops (e.g., two hops).

B. Illustrative Processes

FIGS. 9 and 10 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 9 is a flowchart that provides an overview of one process 902 for creating a relational data structure, such as, but not limited to, the graphical data structure 104 described in Section A. In block 904, the computing environment 102 receives a first collection of data items from one or more application data stores 106 associated with one or more application sources 108. The first collection of data items pertains to one or more users. At least some of the first collection of data items evince interest by the user(s) with plural subjects. In block 906, the computing environment 102 extracts keyphrases from the first collection of data items. In block 908, the computing environment 102 receives a second collection of data items from one or more knowledge data stores 110 associated with one or more knowledge sources 112; these data items express knowledge about at least some of the keyphrases. In block 910, the computing environment 102 identifies relations between the second collection of data items and respective keyphrases. In block 912, the computing environment 102 generates a relational data structure 104 that includes: first objects respectively associated with data items in the first collection of data items, the first objects including keyphrase objects associated with the keyphrases; second objects respectively associated with data items in the second collection of data items; and links that reflect relations among the first objects, and relations between the keyphrase objects and the second objects. In block 914, the computing environment 102 stores the relational data structure 104 in a data store 120. The relational data structure 104 exists apart from data items in the application data stores 106 and the knowledge data stores 110, without affecting the data items in these data stores (106, 110).

FIG. 10 is a flowchart that provides an overview of one process 1002 for interrogating a relational data structure 104. In block 1004, the computing environment 102 receives a query in response to interaction by a user with an input device. In block 1006, the computing environment 102 optionally identifies an initial set of objects that match the query in a relational data structure 104. In block 1008, the computing environment 102 optionally expands the initial set of objects by identifying additional objects that are linked to the initial set of objects, as bounded by a specified degree of relationship to the initial set of objects. The initial set of objects and the additional objects correspond to a portion of the original relational data structure. In block 1010, the computing environment 102 performs a ranking operation on the portion to provide an output result, the output result identifying one or more objects in the relational data structure 104 that match the query, ordered by relevance to the query. In block 1012, the computing environment 102 optionally filters the output result based on a specified filtering condition, to only include objects of a specified type or types. In block 1014, the computing environment 102 provides the filtered output result to an output device. In block 1016, the computing environment 102 optionally posts a skill and/or other user attribute(s) gleaned from the output result to a knowledge source, such as an online social networking site. As explained in Section A, some searches may omit one or more of the processing blocks shown in FIG. 10.

C. Representative Computing Functionality

Figure 11:
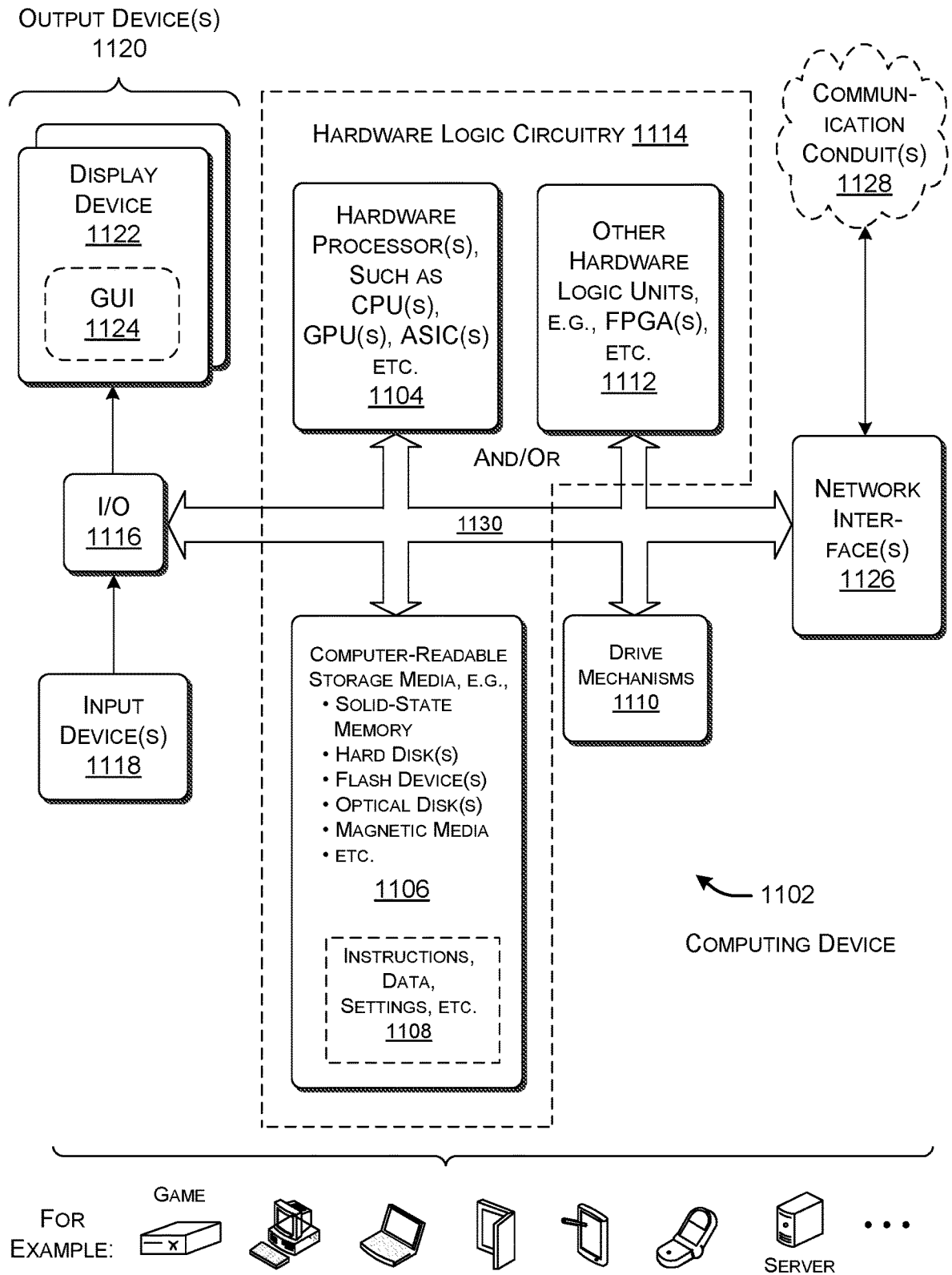
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, with reference to FIG. 2, the type of computing device 1102 shown in FIG. 11 can be used to implement any user computing device or any server. In all cases, the computing device 1102 represents a physical and tangible processing mechanism.

The computing device 1102 can include one or more hardware processors 1104. The hardware processor(s) 1102 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing device 1102. Further, any instance of the computer-readable storage media 1106 may provide volatile or non-volatile retention of information.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing device 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s).

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units may correspond to discrete hardware units provided in a computing device chassis having any form factor. FIG. 11 shows illustrative form factors in its bottom portion. In other cases, the computing device 1102 can include a hardware logic unit that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative aspects of the technology set forth herein.

According to a first aspect, one or more computing devices are described including hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates. The operations include: receiving a first collection of data items from one or more application data stores associated with one or more application sources, the first collection of data items pertaining to one or more users, at least some of the first collection of data items evincing interest by the one or more users with plural subjects; extracting keyphrases from the first collection of data items; receiving a second collection of data items from one or more knowledge data stores associated with one or more knowledge sources that express knowledge about at least some of the keyphrases; identifying relations between the second collection of data items and respective keyphrases; and generating a relational data structure. The relational data structure includes: first objects respectively associated with data items in the first collection of data items, the first objects including keyphrase objects associated with the keyphrases; second objects respectively associated with data items in the second collection of data items; and links that reflect relations among the first objects, and relations between the keyphrase objects and the second objects. The operations also include storing the relational data structure in another data store. The relational data structure exists apart from data items in the one or more application data stores and the one or more knowledge data stores, without affecting the data items in the one or more application data stores and the one or more knowledge stores.

According to a second aspect, each first object includes a pointer that points to a location in an application data store in which a corresponding data item in the first collection is stored.

According to a third aspect, at least some of the first collection of data items are created by the one or more users using the one or more application sources.

According to a fourth aspect, the first objects also include: person objects associated with the one or more users; message objects associated with messages exchanged among the one or more users; meeting objects associated with meetings that identify the one or more users as attendees; and document objects associated with documents authored by the one or more users.

According to a fifth aspect, the first objects also include task objects associated with tasks to be performed by the one or more users.

According to a sixth aspect, the operations further include identifying topics associated with the keyphrases. The relational data structure further includes topic objects associated with the topics.

According to a seventh aspect, at least some of the second data items describe respective user skills. The one or more knowledge sources include a network-accessible service that provides the second data items that describe the user skills.

According to an eighth aspect, the second collection of data items includes a collection of terms specified by a first knowledge source. The operation of identifying includes, for each given term in the collection of terms: expanding the given term to include a group of related terms, based on knowledge provide by one or more second knowledge sources, other than the first knowledge source; and linking a keyphrase to the given term based on a finding that the group of related terms associated with the given term includes the keyphrase.

According to a ninth aspect, the operations further include: receiving a query in response to interaction by a user with an input device; performing a ranking operation on the relational data structure to provide an output result, the output result identifying one or more objects in the relational data structure that match the query, ordered by relevance to the query; and providing the output result to an output device.

According to a tenth aspect, relating to the ninth aspect, the ranking operation is performed on a portion of the relational data structure. The operations further include generating the portion by: identifying an initial set of objects that match the query; and expanding the initial set of objects by identifying additional objects that are linked to the initial set of objects, as bounded by a specified degree of relationship to the initial set of objects, the initial set of objects and the additional objects corresponding to the portion.

According to an eleventh aspect, relating to the ninth aspect, the query also specifies at least one type of object as a filtering condition. The output result is constrained to include only the specified object type or types.

According to a twelfth aspect, relating to the ninth aspect, the query identifies a particular user, and the output result identifies one or more skills possessed by the particular user.

According to a thirteenth aspect, relating to the ninth aspect, the query identifies a particular skill, and wherein the output result identifies one or more users who are associated with the particular skill.

According to a fourteenth aspect, relating to the ninth aspect, the query identifies a particular keyphrase, and the output result identifies one or more other keyphrases that are associated with the particular keyphrase.

According to a fifteenth aspect, a method is described, performed by one or more computing devices, for operating on a relational data structure. The method includes: receiving a query in response to interaction by a user with an input device; performing a ranking operation on the relational data structure to provide an output result, the output result identifying one or more objects in the relational data structure that match the query, ordered by relevance to the query; and providing the output result to an output device. The relational data structure includes: first objects respectively associated with data items in a first collection of data items, the first objects including keyphrase objects associated with keyphrases extracted from the first collection of data items; second objects respectively associated with data items in a second collection of data items; and links that reflect relations among the first objects, and relations between the keyphrase objects and the second objects. The first collection of data items are obtained from one or more application data stores associated with one or more application sources and pertain to one or more users, at least some of the first collection of data items evincing interest by the one or more users with plural subjects. The second collection of data items are obtained from one or more knowledge data stores associated with one or more knowledge sources that express knowledge about keyphrases extracted from the first collection of data items. The relational data structure exists apart from data items in the one or more application data stores and the one or more knowledge data stores, without affecting the data items in the one or more application data stores and the one or more knowledge stores.

According to a sixteenth aspect, relating to the fifteenth aspect, the first objects also include: person objects associated with the one or more users; message objects associated with messages exchanged among the one or more users; meeting objects associated with meetings that identify the one or more users as attendees; and document objects associated with documents authored by the one or more users.

According to a seventeenth aspect, relating to the fifteenth aspect, the ranking operation is performed on a portion of the relational data structure. The method further includes generating the portion by: identifying an initial set of objects that match the query; and expanding the initial set of objects by identifying additional objects that are linked to the initial set of objects, as bounded by a specified degree of relationship to the initial set of objects, the initial set of objects and the additional objects corresponding to the portion.

According to an eighteenth aspect, relating to the seventeenth aspect, the query identifies a particular user, and the output result identifies one or more skills possessed by the particular user.

According to a nineteenth aspect, relating to the fifteenth aspect, the query identifies a particular skill, and the output result identifies one or more users who are associated with the particular skill.

According to a twentieth aspect, a computer-readable storage medium for storing computer-readable instructions is described. The computer-readable instructions, when executed by one or more hardware processors, perform a method that includes: receiving a first collection of data items from one or more application data stores associated with one or more application sources, the first collection of data items pertaining to one or more users, at least some of the first collection of data items evincing interest by the one or more users with plural subjects; extracting keyphrases from the first collection of data items; receiving a second collection of data items from one or more knowledge data stores associated with one or more knowledge sources that express knowledge about at least some of the keyphrases; identifying relations between the second collection of data items and respective keyphrases; and generating a relational data structure. The relational data structure includes: first objects respectively associated with data items in the first collection of data items, the first objects including keyphrase objects associated with the keyphrases; second objects respectively associated with data items in the second collection of data items; and links that reflect relations among the first objects, and relations between the keyphrase objects and the second objects. The method also includes storing the relational data structure in a data store, the relational data structure existing apart from data items in the one or more application data stores and the one or more knowledge data stores, without affecting the data items in the one or more application data stores and the one or more knowledge stores; receiving a query in response to interaction by a user with an input device; performing a ranking operation on the relational data structure to provide an output result, the output result identifying one or more objects in the relational data structure that match the query, ordered by relevance to the query; and providing the output result to an output device.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices, comprising:
hardware logic circuitry, the hardware logic circuitry including: (a) one or more hardware processors that perform operations by executing machine-readable instructions stored in a memory, and/or (b) one or more other hardware logic units that perform the operations using a collection of logic gates, the operations including:
receiving a first collection of data items from one or more application data stores associated with one or more application sources, the first collection of data items pertaining to one or more users, at least some of the first collection of data items evincing interest by said one or more users with plural subjects;
extracting keyphrases from the first collection of data items;
receiving a second collection of data items from one or more knowledge data stores associated with one or more knowledge sources that express knowledge about at least some of the keyphrases;
identifying relations between the second collection of data items and respective keyphrases;
generating a relational data structure that includes:
first objects that respectively describe data items in the first collection of data items, the first objects including keyphrase objects that describe the keyphrases;
second objects that respectively describe data items in the second collection of data items; and
links that describe relations among the first objects, and relations between the keyphrase objects and the second objects; and
storing the relational data structure in another data store,
the relational data structure existing apart from data items in said one or more application data stores and said one or more knowledge data stores, without affecting the data items in said one or more application data stores and said one or more knowledge stores,
wherein the second collection of data items includes a collection of terms specified by a first knowledge source,
wherein said identifying includes, for each given term in the collection of terms:
expanding the given term to include a group of related terms, based on knowledge provide by one or more second knowledge sources, other than the first knowledge source; and
linking a keyphrase to the given term based on a finding that the group of related terms associated with the given term includes the keyphrase.

2. The one or more computing devices of claim 1, wherein each first object includes a pointer that points to a location in an application data store in which a corresponding data item in the first collection is stored.

3. The one or more computing devices of claim 1, wherein at least some of the first collection of data items are created by said one or more users using said one or more application sources.

4. The one or more computing devices of claim 1, wherein the first objects also include:
person objects that describe said one or more users;
message objects that describe messages exchanged among said one or more users;
meeting objects that describe meetings that identify said one or more users as attendees; and
document objects that describe documents authored by said one or more users.

5. The one or more computing devices of clam 4, wherein the first objects also include task objects that describe tasks to be performed by said one or more users.

6. The one or more computing devices of claim 1, wherein the operations further comprise identifying topics associated with the keyphrases, and wherein the relational data structure further includes topic objects associated with the topics.

7. The one or more computing devices of claim 1,
wherein at least some of the second data items describe respective user skills, and
wherein said one or more knowledge sources include a network-accessible service that provides the second data items that describe the user skills.

8. The one or more computing devices of claim 1, wherein the operations further include:
receiving a query in response to interaction by a user with an input device;
performing a ranking operation on the relational data structure to provide an output result, the output result identifying one or more objects in the relational data structure that match the query, ordered by relevance to the query; and
providing the output result to an output device.

9. The one or more computing devices of claim 8,
wherein the ranking operation is performed on a portion of the relational data structure,
wherein the operations further include generating the portion by:
identifying an initial set of objects that match the query; and
expanding the initial set of objects by identifying additional objects that are linked to the initial set of objects, as bounded by a specified degree of relationship to the initial set of objects,
the initial set of objects and the additional objects corresponding to the portion.

10. The one or more computing devices of claim 8,
wherein the query also specifies at least one type of object as a filtering condition, and
wherein the output result is constrained to include only the specified object type or types.

11. The one or more computing devices of claim 8,
wherein the query identifies a particular user, and
wherein the output result identifies one or more skills possessed by the particular user.

12. The one or more computing devices of claim 8,
wherein the query identifies a particular skill, and
wherein the output result identifies one or more users who are associated with the particular skill.

13. The one or more computing devices of claim 8,
wherein the query identifies a particular keyphrase, and
wherein the output result identifies one or more other keyphrases that are associated with the particular keyphrase.

14. A method, performed by one or more computing devices, for operating on a relational data structure, comprising:
receiving a query in response to interaction by a user with an input device;
performing a ranking operation on the relational data structure to provide an output result, the output result identifying one or more objects in the relational data structure that match the query, ordered by relevance to the query; and
providing the output result to an output device,
the relational data structure including:
first objects that respectively describe data items in a first collection of data items, the first objects including keyphrase objects that describe keyphrases extracted from the first collection of data items;
second objects that respectively describe data items in a second collection of data items; and links that describe relations among the first objects, and relations between the keyphrase objects and the second objects, the first collection of data items obtained from one or more application data stores associated with one or more application sources and pertaining to one or more users, at least some of the first collection of data items evincing interest by said one or more users with plural subjects, the second collection of data items obtained from one or more knowledge data stores associated with one or more knowledge sources that express knowledge about the keyphrases extracted from the first collection of data items, the relational data structure existing apart from data items in said one or more application data stores and said one or more knowledge data stores, without affecting the data items in said one or more application data stores and said one or more knowledge stores, wherein the ranking operation is performed on a portion of the relational data structure, wherein the method further includes generating the portion by:

identifying an initial set of objects that match the query; and expanding the initial set of objects by identifying additional objects that are linked to the initial set of objects, as bounded by a specified degree of relationship to the initial set of objects, the initial set of objects and the additional objects corresponding to the portion.

15. The method of claim 14, wherein the first objects also include:

person objects that describe said one or more users;

message objects that describe messages exchanged among said one or more users;

meeting objects that describe meetings that identify said one or more users as attendees; and document objects that describe documents authored by said one or more users.

16. The method of claim 14,
wherein the query identifies a particular user, and
wherein the output result identifies one or more skills possessed by the particular user.

17. The method of claim 14,
wherein the query identifies a particular skill, and
wherein the output result identifies one or more users who are associated with the particular skill.

18. A computer-readable storage medium for storing computer-readable instructions, the computer-readable instructions, when executed by one or more hardware processors, performing a method that comprises:

receiving a first collection of data items from one or more application data stores associated with one or more application sources, the first collection of data items pertaining to one or more users, at least some of the first collection of data items evincing interest by said one or more users with plural subjects;

extracting keyphrases from the first collection of data items;

receiving a second collection of data items from one or more knowledge data stores associated with one or more knowledge sources that express knowledge about at least some of the keyphrases;

identifying relations between the second collection of data items and respective keyphrases;

generating a relational data structure that includes:

first objects that respectively describe data items in the first collection of data items, the first objects including keyphrase objects that describe the keyphrases;

second objects that respectively describe data items in the second collection of data items; and links that describe relations among the first objects, and relations between the keyphrase objects and the second objects;

storing the relational data structure in a data store, the relational data structure existing apart from data items in said one or more application data stores and said one or more knowledge data stores, without affecting the data items in said one or more application data stores and said one or more knowledge stores;

receiving a query in response to interaction by a user with an input device;

performing a ranking operation on the relational data structure to provide an output result, the output result identifying one or more objects in the relational data structure that match the query, ordered by relevance to the query; and providing the output result to an output device, wherein the second collection of data items includes a collection of terms specified by a first knowledge source, wherein said identifying includes, for each given term in the collection of terms:

expanding the given term to include a group of related terms, based on knowledge provide by one or more second knowledge sources, other than the first knowledge source; and linking a keyphrase to the given term based on a finding that the group of related terms associated with the given term includes the keyphrase.

* * * * *